(12) United States Patent
Fukawatase et al.

(10) Patent No.: US 7,722,076 B2
(45) Date of Patent: May 25, 2010

(54) KNEE AIRBAG DEVICE

(75) Inventors: Osamu Fukawatase, Aichi-ken (JP);
Tomoyuki Moro, Toyota (JP); Kenji Imamura, Kosai (JP); Akiyoshi Sanada, Aichi-ken (JP); Yuichi Adachi, Aichi-ken (JP); Kazuaki Bito, Aichi-ken (JP)

(73) Assignees: Toyota Jidosha Kabuhsiki Kaisha, Toyota (JP); Toyoda Gosei Co., Ltd., Nishikasugai (JP)

( * ) Notice: Subject to any disclaimer, the term of this patent is extended or adjusted under 35 U.S.C. 154(b) by 195 days.

(21) Appl. No.: 11/979,819

(22) Filed: Nov. 8, 2007

(65) Prior Publication Data
US 2008/0111353 A1 May 15, 2008

(30) Foreign Application Priority Data
Nov. 9, 2006 (JP) .............................. 2006-303769

(51) Int. Cl.
*B60R 21/203* (2006.01)
*B60R 21/231* (2006.01)

(52) U.S. Cl. .................................. 280/730.1; 280/731
(58) Field of Classification Search ............. 280/730.1, 280/731, 751, 752
See application file for complete search history.

(56) References Cited

U.S. PATENT DOCUMENTS

| | | | |
|---|---|---|---|
| 5,570,901 A | 11/1996 | Fyrainer | |
| 5,904,366 A * | 5/1999 | Nishijima et al. | 280/728.2 |
| 6,089,600 A * | 7/2000 | Schenck et al. | 280/740 |
| 6,817,624 B2 * | 11/2004 | Lorenz et al. | 280/728.2 |
| 6,942,245 B2 | 9/2005 | Takimoto et al. | |
| 7,052,037 B2 * | 5/2006 | Nakayasu et al. | 280/730.2 |
| 7,370,881 B2 * | 5/2008 | Takimoto et al. | 280/730.1 |
| 2008/0100042 A1 * | 5/2008 | Adachi et al. | 280/730.1 |
| 2008/0217888 A1 * | 9/2008 | Fukawatase et al. | 280/730.1 |
| 2009/0174173 A1 * | 7/2009 | Adachi et al. | 280/730.1 |

FOREIGN PATENT DOCUMENTS

| | | |
|---|---|---|
| JP | A-09-104317 | 4/1997 |
| JP | B2-2759065 | 5/1998 |
| JP | A-2002-037003 | 2/2002 |
| JP | A-2002-337650 | 11/2002 |
| JP | A-2005-271774 | 10/2005 |
| JP | B2-3752920 | 3/2006 |
| JP | B2-3760424 | 3/2006 |
| JP | A-2006-224776 | 8/2006 |
| JP | A-2007-131082 | 5/2007 |
| WO | WO 02/04261 A1 | 1/2002 |

* cited by examiner

*Primary Examiner*—Paul N Dickson
*Assistant Examiner*—Drew Brown
(74) *Attorney, Agent, or Firm*—Oliff & Berridge, PLC

(57) ABSTRACT

A knee airbag device includes a knee airbag that is disposed in a folded state inside a steering column cover inside which a projection body that projects downward toward one side in a vehicle-width direction is disposed in a rear area, and a cylindrical inflator that supplies the gas to the knee airbag to deploy the knee airbag. The inflator is disposed inside the steering column cover such that at least a portion of the inflator is positioned in the rear area inside the steering column cover. The inflator is disposed in substantially parallel with an axis of a column tube such that the inflator is positioned below the column tube. The end portion of the inflator, in which a gas injection port is formed, faces toward a rear of the vehicle.

13 Claims, 6 Drawing Sheets

KNEE AIRBAG DEVICE

INCORPORATION BY REFERENCE

The disclosure of Japanese Patent Application No. 2006-303769 filed on Nov. 9, 2006 including the specification, drawings and abstract is incorporated herein by reference in its entirety.

BACKGROUND OF THE INVENTION

1. Field of the Invention

The invention relates to a knee airbag device.

2. Description of the Related Art

Japanese Patent Application Publication No. 9-104317 (JP-A-9-104317), JP-A-8-301054, JP-A-2002-37003 and JP-A-2002-337650 describe a knee airbag device in which a knee airbag module is disposed inside a steering column cover that covers a steering column.

In the knee airbag device provided inside the steering column cover, it is necessary to dispose an inflator, which is a gas supply source, at a position closest possible to the knees of an occupant to efficiently deploy a knee airbag toward the knees of the occupant. That is, it is preferable to dispose the inflator in a rear area in a vehicle longitudinal direction inside the steering column cover.

However, a projection body such as a key cylinder may be provided in an inclined state in a rear area in a vehicle longitudinal direction inside the steering column cover to project downward toward one side in a vehicle-width direction. Therefore, it is difficult to dispose the cylindrical inflator such that the inflator extends in the vehicle-width direction.

However, in the knee airbag device described in the above publication, the inflator is disposed without taking into account the projection body such as the key cylinder. Also, a telescopic mechanism, or a mechanism, which contracts the steering column so that a steering wheel moves forward to absorb impact when a vehicle has a frontal collision, is provided in the rear area inside the steering column cover. Accordingly, the inflator needs to be configured such that the inflator does not interfere with the contraction of the steering column in the axial direction even when the inflator is disposed at a position close to the knees of the occupant.

SUMMARY OF THE INVENTION

The invention makes it possible to efficiently deploy a knee airbag by disposing an inflator inside a steering column cover at the optimum position.

A first aspect of the invention relates to a knee airbag device that includes a knee airbag that is disposed in a folded state inside a steering column cover inside which a projection body that projects downward toward one side in a vehicle-width direction is disposed in a rear area in a vehicle-longitudinal direction, wherein when the knee airbag receives gas, the knee airbag is inflated and deployed from an inside of the steering column cover toward a vehicle cabin; and an inflator having a cylindrical shape, which supplies the gas to the knee airbag to deploy the knee airbag. In the knee airbag device, the inflator is disposed inside the steering column cover such that at least a portion of the inflator is positioned in the rear area inside the steering column cover; the inflator is disposed in substantially parallel with an axis of a column tube such that the inflator is positioned below the column tube; and an end portion of the inflator, in which a gas injection port is formed, faces toward a rear of the vehicle.

In the knee airbag device, the inflator having a cylindrical shape is disposed inside the steering column cover at the position below the column tube. At least a portion of the inflator is positioned in the rear area inside the steering column cover, and the inflator is positioned in substantially parallel with the axis of the column tube. Therefore, even when the projection body, disposed in the rear area inside the steering column cover, projects downward toward one side in the vehicle-width direction, the inflator does not interfere with the projection body. Therefore, it is possible to efficiently deploy the knee airbag by disposing the inflator inside the steering column cover at the optimum position, that is, the position close to the knees of the occupant, and quickly supplying the gas to the knee airbag.

In knee airbag device according to the first aspect, the inflator may be disposed substantially directly under the column tube.

In the above-described knee airbag device, the inflator is disposed substantially directly under the column tube. Therefore, when the inflator supplies the gas to the knee airbag, the gas is equally supplied to areas of the knee airbag, which are positioned on right and left sides of the column tube in the vehicle-width direction.

In the knee airbag device according to the first aspect, the inflator may be disposed on a side opposite to a side where the projection body is disposed in the vehicle-width direction.

In the above-described knee airbag device, it is possible to easily avoid the interference between the projection body and the inflator, by disposing the inflator on the side opposite to the side where the projection body is disposed in the vehicle-width direction. Thus, it is possible to efficiently deploy the knee airbag, while effectively using the limited space inside the steering column cover.

In the first aspect, the inflator may be connected to a member inside the steering column cover such that the inflator slides in a longitudinal direction of the inflator.

In the above-described aspect, the inflator is connected to the member inside the steering column cover such that the inflator is movable in the longitudinal direction of the inflator. Therefore, the inflator does not interfere with the extension and contraction of a steering column when the steering column is telescopically operated.

A second aspect of the invention relates to a knee airbag device that includes a knee airbag that is disposed in a folded state inside a steering column cover inside which a projection body that projects downward toward one side in a vehicle-width direction is disposed in a rear area in a vehicle longitudinal direction, wherein when the knee airbag receives gas, the knee airbag is inflated and deployed from an inside of the steering column cover toward a vehicle cabin; and an inflator having a cylindrical shape, which supplies the gas to the knee airbag to deploy the knee airbag. In the knee airbag device, the inflator is disposed inside the steering column cover such that at least a portion of the inflator is positioned in the rear area inside the steering column cover; the inflator is disposed on a first plane; the first plane is substantially parallel to a plane that includes an axis of a column tube and an axis of the projection body, and the first plane is positioned below the column tube; and an end portion of the inflator, in which a gas injection port is formed, faces toward a lower surface of the steering column cover and a rear of a vehicle.

In the above-described aspect, the inflator is disposed on the first plane. The first plane is substantially parallel to the plane that includes the axis of the column tube and the axis of the projection body, and the first plane is positioned below the column tube. Therefore, the inflator does not interfere with the projection body. Thus, it is possible to efficiently deploy the knee airbag by disposing the inflator inside the steering column cover at the optimum position, that is, the position close to the knees of the occupant, and quickly supplying the gas from the inflator to the knee airbag.

In the second aspect, the inflator may be disposed in substantially parallel with the axis of the projection body.

In the knee airbag device according to the above-described aspect, because the inflator having a cylindrical shape is disposed below the column tube, and in substantially parallel with the axis of the projection body, the inflator does not interfere with the projection body. Thus, it is possible to efficiently deploy the knee airbag, by disposing the inflator inside the steering column cover at the optimum position, that is, the position close to the knees of the occupant, and quickly supplying the gas from the inflator to the knee airbag.

A third aspect of the invention relates to a knee airbag device that includes a knee airbag that is disposed in a folded state inside a steering column cover inside which a projection body that projects downward toward one side in a vehicle-width direction is disposed in a rear area in a vehicle longitudinal direction, wherein when the knee airbag receives gas, the knee airbag is inflated and deployed from an inside of the steering column cover toward a vehicle cabin; and an inflator having a cylindrical shape, which supplies the gas to the knee airbag to deploy the knee airbag. In the knee airbag device, the inflator is disposed inside the steering column cover such that at least a portion of the inflator is positioned in the rear area inside the steering column cover; the inflator is disposed on a first plane at a position below a column tube; the first plane is a vertical plane that includes an axis of the projection body; and an end portion of the inflator, in which a gas injection port is formed, faces toward a lower surface of the column cover.

In the above-described aspect, the inflator is disposed directly under the projection body such that the inflator does not interfere with the projection body. Therefore, it is possible to dispose the inflator inside the steering column cover at the optimum position, that is, the position close to the knees of the occupant.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, embodiments of the invention will be described with reference to the accompanying drawings.

[First Embodiment]

Figure 1A:
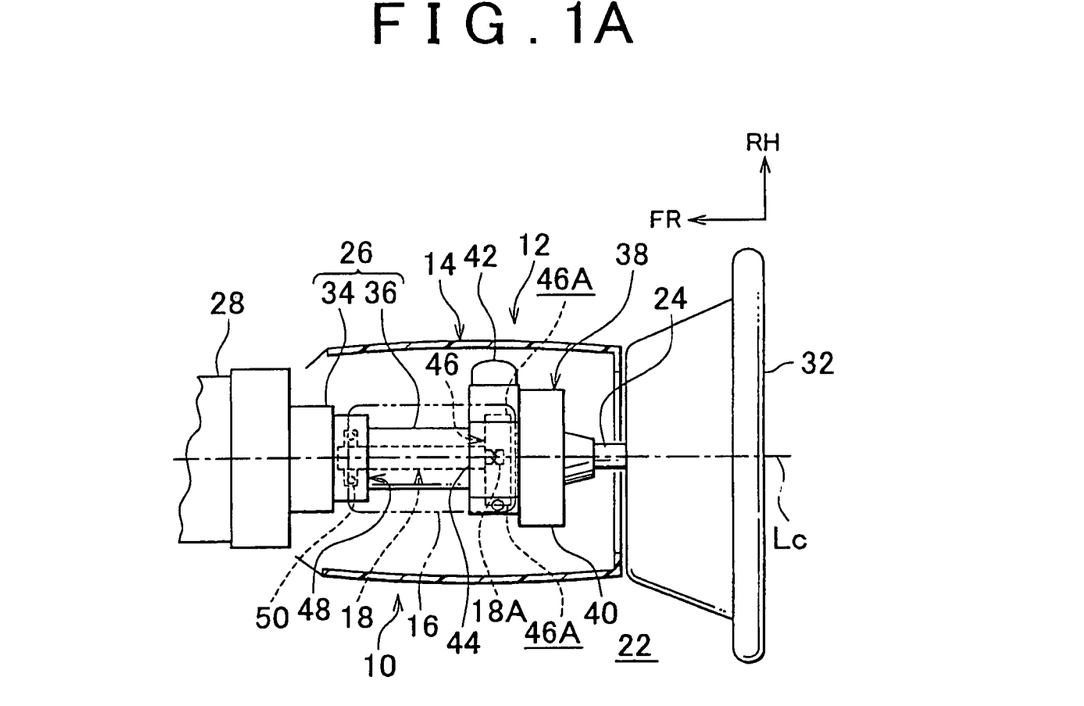
FIG. 1A is a cross sectional view showing a knee airbag device according to a first embodiment in the plan view of a vehicle.
Figure 1B:
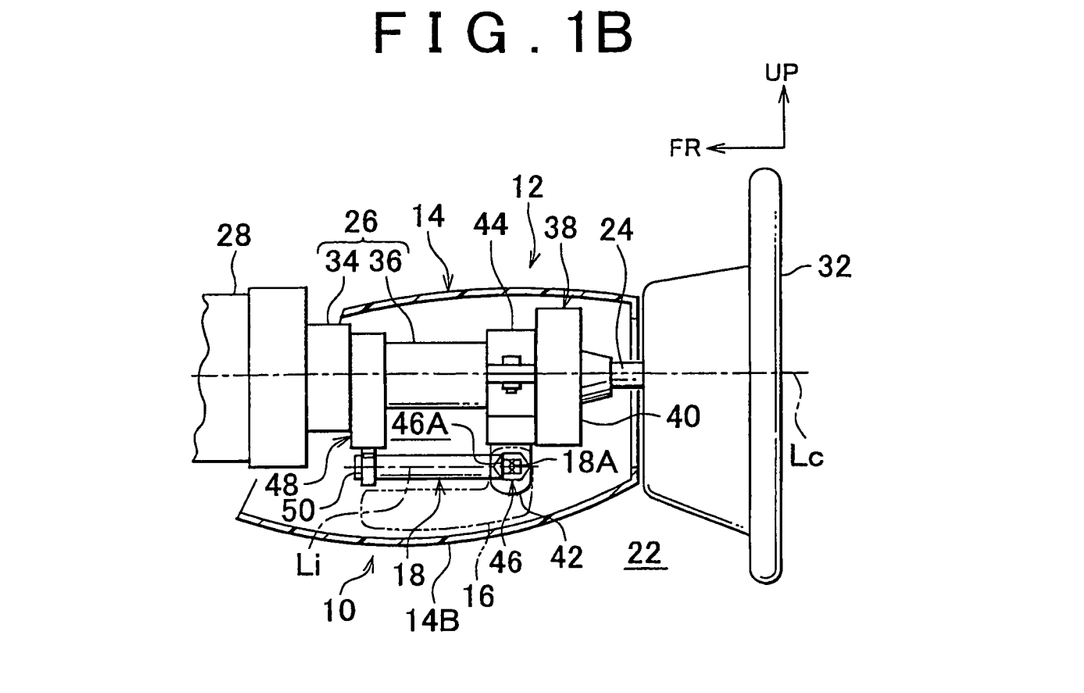
FIG. 1B is a cross sectional view showing the knee airbag device according to the first embodiment in the lateral view of the vehicle.

In FIG. 1B, a knee airbag device 10 according to the first embodiment includes a knee airbag 16 and an inflator 18 having a cylindrical shape. The knee airbag 16 is disposed in a folded state inside a steering column cover 14 that covers a steering column 12. Hereinafter, "rear" indicates the rear of a vehicle and "front" indicates the front of the vehicle.

First, the configuration of the steering column 12 will be briefly described. An opening portion (not shown) is formed on a portion of an instrument panel (not shown), which faces a driver seat. A steering column 12 is inserted through the opening portion such that the steering column 12 is inclined downward toward the front of the vehicle. A steering column cover 14 is disposed adjacent to the opening portion of the instrument panel. The steering column cover 14 covers the rear end portion of the steering column 12. The steering column cover 14 protrudes toward a vehicle cabin 22.

For example, the steering column 12 includes a steering main shaft 24, a column tube 26, and a tilt telescopic drive mechanism 28. The steering main shaft 24 is disposed in the core of the steering column 12. The column tube 26, which covers the steering main shaft 24, is supported by a vehicle body. The tilt telescopic drive mechanism 28 is disposed in front of the column tube 26. A steering wheel 32 is fixed at the rear end of the steering main shaft 24 by a lock nut (not shown). The column tube 26 includes an outer tube 34, and an inner tube 36. The outer tube 34 is fixed close to the telescopic drive mechanism 28. The inner tube 36 is movable. When the steering main shaft 24 and the column tube 26 are telescopically operated, the steering main shaft 24 and the column tube 26 are extended and contracted (i.e., movable in the axial direction) in a predetermined stroke range. In addition, when a load equal to or greater than a predetermined value is applied from the steering wheel 32 to the steering main shaft 24, i.e., toward the front in the axial direction, the steering main shaft 24 and the column tube 26 are contracted in the predetermined stroke range.

A so-called combination switch 38 is connected to the column tube 26 at a position close to the rear end of the column tube 26. The combination switch 38 includes a main body portion 40, and a pair of right and left operation levers (not shown). The main body portion 40, which has a ring shape, is disposed around the outer peripheral portion of the column tube 26 at the position close to the rear end of the column tube 26. The right and left operation levers (not shown) protrude from the right and left side portions of the main body portion 40, and extend through the steering column cover 14. The configuration of the steering column 12 is not limited to the above-described configuration.

In FIGS. 1A and 1B, a steering lock device 42, which is an example of a projection body, is provided in a rear area in a vehicle-longitudinal direction inside the steering column cover 14. The steering lock device 42 projects downward, for example, toward one side in the vehicle-width direction. For example, the steering lock device 42 is combined with a key cylinder (not shown), and is connected to the column tube 24 at a position close to the rear end of the column tube 24, using a fitting portion 44 that has a ring shape. Taking into account that a key is inserted into and removed from the key cylinder, the steering lock device 42 extends diagonally downward to the right from the column tube 24. Thus, the steering lock device 42 projects downward toward one side in the vehicle-width direction, for example, the right side in the vehicle-width direction. When a predetermined key operation is performed, a pin or the like (not shown) is engaged with the steering main shaft 24 to lock the rotational movement of the steering main shaft 24.

An airbag module (not shown) is stored inside the steering column cover 14. The airbag module includes the knee airbag 16 in the folded state, and the cylindrical inflator 18 that supplies the gas to the knee airbag 16 to deploy the knee airbag 16. The inflator 18 is operated by ignition current supplied from an airbag ECU (not shown). When the knee airbag 16, which receives the gas from the inflator 18, is inflated and deployed, an airbag door (not shown) provided mainly in the lower surface 14B of the steering column cover 14 is opened due to deployment pressure of the knee airbag 16. As a result, an opening portion is formed by opening the airbag door, and the knee airbag 16 protrudes from the opening portion into a vehicle cabin 22.

Figure 2:
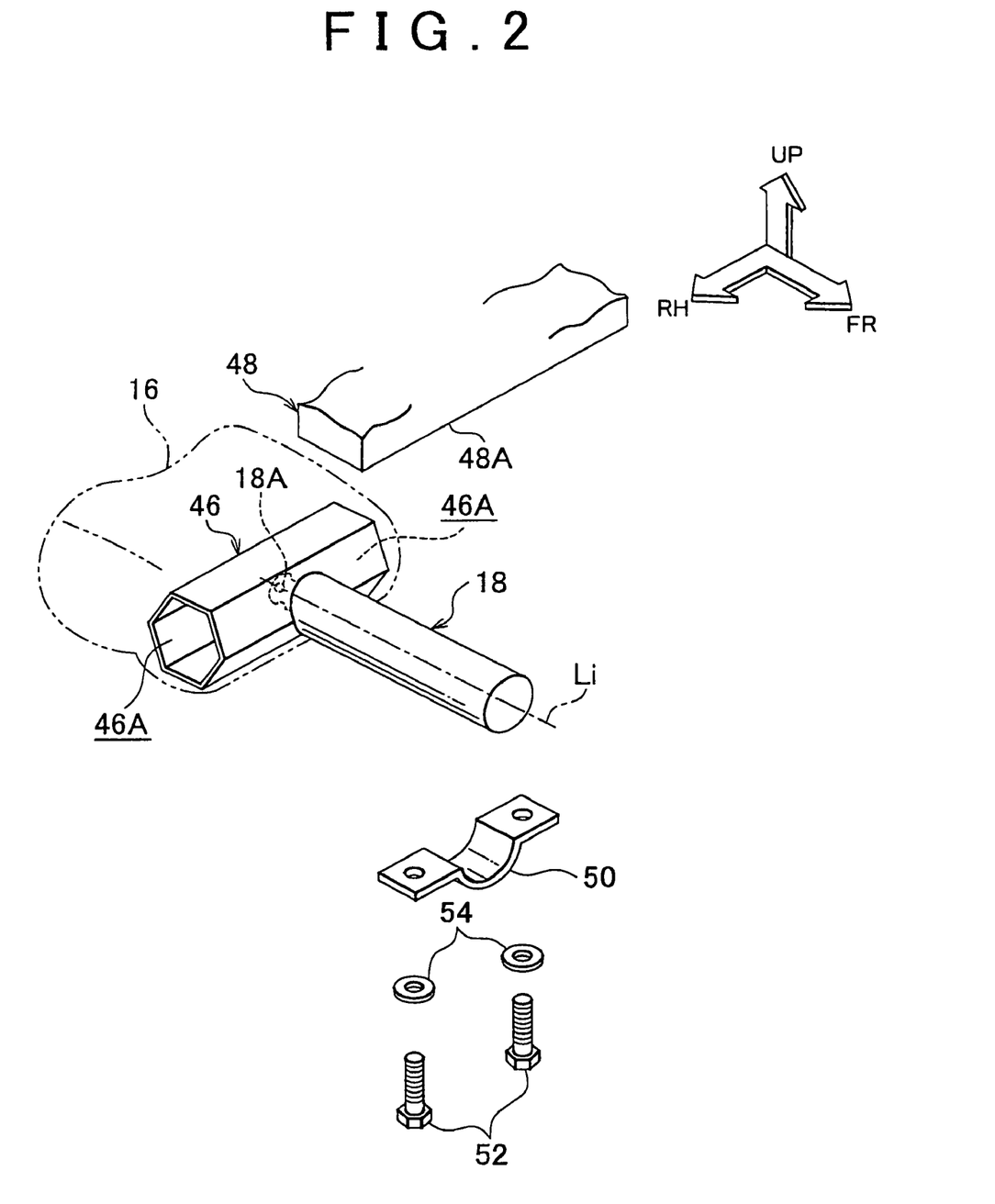
FIG. 2 is an enlarged exploded perspective view showing an inflator that includes a diffuser, and a base and a support fitting that support the inflator in the first embodiment.

As shown in FIG. 1A and FIG. 1B, the inflator 18 is disposed inside the steering column cover 14 at a position directly under the column tube 26. The inflator 18 is disposed inside the steering column cover 14 such that at least a portion of the inflator 18 is positioned in the rear area inside the steering column cover 14. The inflator 18 is disposed in substantially parallel with the axis Lc of the column tube 26. More specifically, the axis Li of the inflator 18 extends in substantially parallel with the axis Lc of the column tube 26. The end portion of the inflator 18, in which the gas injection ports 18A are formed, faces toward the rear of the vehicle. The end portion of the inflator 18, in which the gas injection ports 18A are formed, is inserted in a diffuser 46. The gas is distributed to the right and left sides in the vehicle-width direction through the diffuser 46. As shown in FIG. 2, for example, the diffuser 46 is tubular, and has a hexagonal cross section. Opening portions 46A are formed at the right and left ends of the diffuser 46 in the vehicle-width direction. The end portion of the inflator 18, in which the gas injection ports 18A are formed, is inserted in the center portion of the diffuser 46 in the vehicle-width direction. The gas injection ports 18A are open in the diffuser 46. The diffuser 46 is disposed inside the knee airbag 16 in the folded state. When the inflator 18 is operated, the gas injected from the gas injection ports 18A is supplied into the knee airbag 16 through the opening portions 46A at the right and left ends of the diffuser 46 in the vehicle-width direction.

The inflator 18 may contain gas-generation agent, or high-pressure gas. An example of the configuration of the inflator 18 will be briefly described. In the case where the inflator 18 contains the gas-generation agent, the inflator 18 includes a cylindrical housing with a bottom, the gas-generation agent, a filter, and an electric ignition type ignition device. A plurality of gas injection ports are formed on the peripheral surface of the housing. The gas-generation agent is disposed inside the housing. When the gas-generation agent is burn, the gas is generated. The filter removes broken pieces after the gas-generation agent is burn. The ignition device is fitted to the open end portion of the housing. The ignition device ignites and burns the gas-generation agent. Also, in the case where the inflator 18 contains the gas-generation agent, because the gas injection ports are formed on the peripheral surface of the housing, for example, the inflator 18 is disposed to extend through the diffuser 46 such that the gas injection ports are positioned inside the diffuser 46.

In the case where the inflator 18 contains high-pressure gas, the inflator 18 includes a cylindrical housing with a bottom, a bulkhead, mixed gas of argon, helium, and the like, a movement member, and an electric ignition type ignition device. The bulkhead is disposed inside the housing. The mixed gas is contained in a chamber defined by the bulkhead and the housing. The movement member is movably disposed close to the bulkhead. When the movement member moves, the movement member breaks the bulkhead. The ignition device is fitted to the open end portion of the housing. The ignition device moves the movement member by ignition. In the knee airbag device 10, the knee airbag 16 is relatively small, and therefore, the required capacity of gas is small. Thus, in most cases, the inflator 18 that contains the high-pressure gas is used in the knee airbag device 10.

In FIG. 1B, a base 48, which supports the inflator 18, is provided at the rear portion of the outer tube 34. For example, when the steering column 12 is telescopically operated, the base 48 and the outer tube 34 are fixed. As shown in FIG. 2, the front portion of the inflator 18 is supported by the lower surface 48A of the base 48 through a support fitting 50 or the like such that the inflator 18 is movable in the axial direction of the column tube 26. When the inflator 18 is disposed in substantially parallel with the axis Lc of the column tube 26 as shown in FIGS. 1A and 1B, the inflator. 18 slides in the axial direction of the column tube 26. The rear end portion of the inflator 18 is fixed to the inner tube 36 of the column tube 26, which is movable, using a bracket (not shown). When the inner tube 36 slides in the vehicle-longitudinal direction, the inflator 18 slides in the vehicle-longitudinal direction, along with the inner tube 36. Because the base 48 and the support fitting 50 are fixed, for example, when the steering column 12 is telescopically operated, the inflator 18 is movable with respect to the support fitting 50 in the direction of the axis of the column tube 26. The support fitting 50 is fixed to the lower surface 48A of the base 48 using bolts 52 screwed into screw holes (not shown) formed on the lower surface 48A, and washers 54.

The configuration for connecting the inflator 18 to the column tube 26 is not limited to the above-described configuration and the illustrated configuration. For example, the inflator 18 may be fixed to a module case (not shown).

[Advantageous Effects]

In the first embodiment, the knee airbag device 10 has the above-described configuration. Hereinafter, the advantageous effects of the knee airbag device 10 will be described. In FIGS. 1A and 1B, in the knee airbag device 10, the inflator 18 is disposed inside the steering column cover 14 at the position directly under the column tube 26 such that a portion of the inflator 18 is positioned in the rear area inside the steering column cover 14, and the axis Li of the inflator 18 extends in substantially parallel with the axis Lc of the column tube 26. Therefore, although the steering lock device 42 is disposed in the rear area inside the steering column cover 14 to project downward toward one side in the vehicle-width direction, the inflator 18 does not interfere with the steering lock device 42. Therefore, it is possible to efficiently deploy the knee airbag 16 by disposing the inflator 18 at the optimum position, that is, the position close to the occupant (not shown), and quickly supplying the gas from the inflator 18 to the knee airbag 16.

In the knee airbag device 10, the end portion of the inflator 18, in which the gas injection ports 18A are formed, faces toward the rear of the vehicle. Therefore, when the inflator 18 is operated, a large amount of gas is supplied to the rear portion of the knee airbag 16. Thus, the rear portion of the knee airbag 16, which is close to the knees (not shown) of the occupant, is first deployed. More specifically, because the gas is supplied to the knee airbag 16 through the opening portions 46A formed at the right and left ends of the diffuser 46 in the vehicle-width direction, right and left end portions of the rear portion of the knee airbag 16 in the vehicle-width direction, which are close to the occupant, are quickly deployed toward the right and left sides in the vehicle-width direction in the process in which the knee airbag 16 is deployed. Therefore, it is possible to more reliably deploy the knee airbag 16 between the knees (not shown) of the occupant and the instrument panel, thereby improving the performance of restraining the knees.

The injection of the gas toward the right and left sides in the vehicle-width direction using the diffuser 46 is also effective in the configuration where the airbag door is opened to form the opening portion that extends in the lower surface 14B, the left side surface 14L, and the right side surface 14R of the steering column cover 14. When the gas is injected toward the right and left sides in the vehicle-width direction using the diffuser 46, the airbag door is opened preferentially toward the right and left sides, and thus, the knee airbag 16 is quickly deployed between the knees of the occupant, which are positioned on the right and left sides of the steering column 12, and the instrument panel.

Further, in the knee airbag device 10, the inflator 18 is movable with respect to the support fitting 50 in the direction of the axis of the column tube 26. Therefore, for example, when the steering column 12 is telescopically operated, the inflator 18 does not interfere with the extension and contraction of the steering column 12. Also, the inflator 18 does not interfere with the stroke of the steering column 12 (i.e.; EA (Energy Absorbing) stroke of the steering column 12) for absorbing an impact at the time of collision.

When the inflator 18 is disposed substantially directly under the column tube 26 as in the embodiment, the gas is equally supplied to areas of the knee airbag 16, which are positioned on the right and left sides of the column tube 26. Therefore, even if the diffuser 46 is not used, the knee airbag 16 is stably deployed.

[Second Embodiment]

Figure 3:
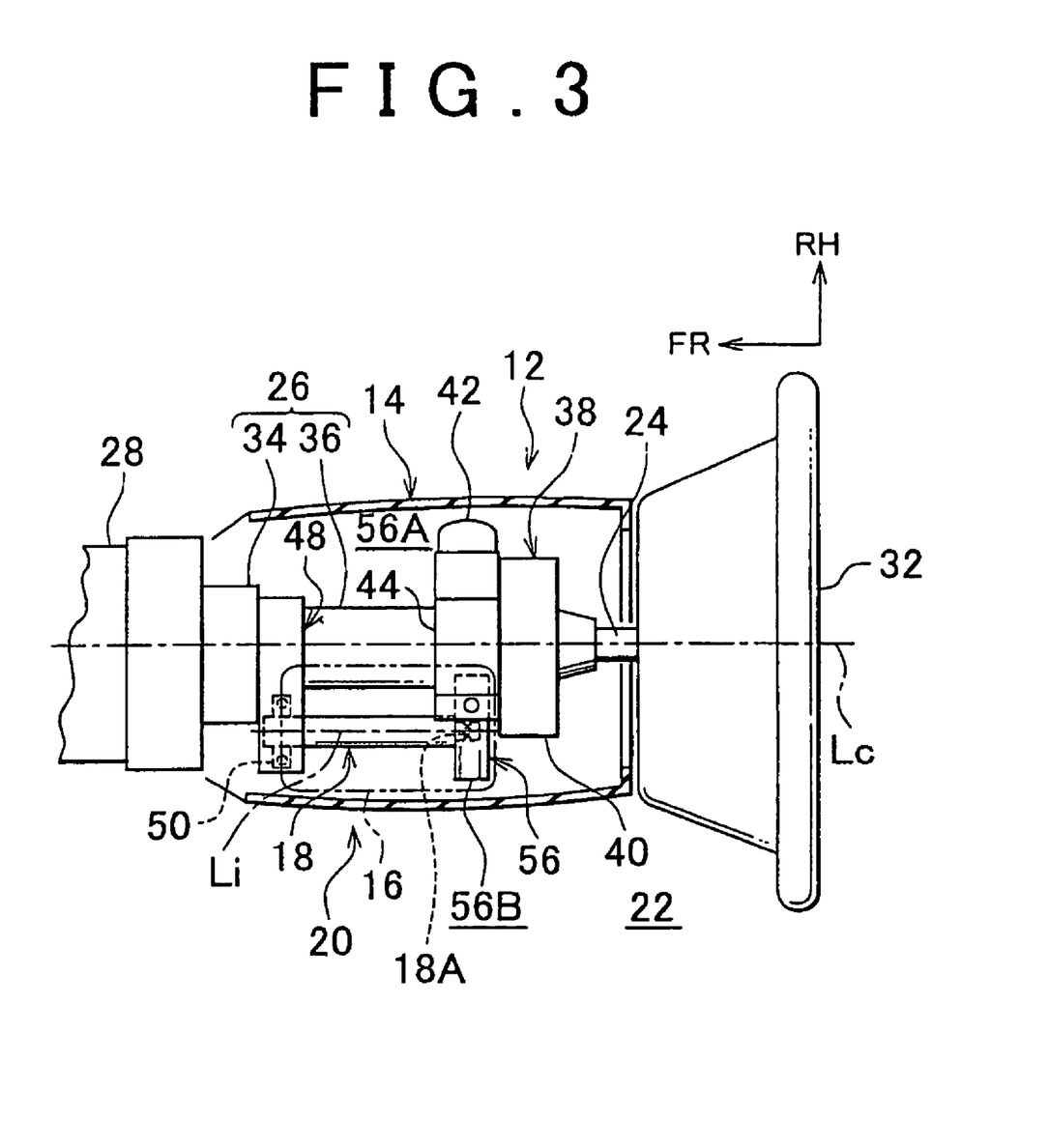
FIG. 3 is a cross sectional view showing a knee airbag device according to a second embodiment in the plan view of the vehicle.

In FIG. 3, in a knee airbag device 20 according to a second embodiment, the inflator 18 is disposed inside the steering column cover 14 at a position below the column tube 26. The inflator 18 is disposed inside the steering column cover 14 such that at least a portion of the inflator 18 is positioned in the rear area inside the steering column cover 14. The inflator 18 is disposed on a side opposite to a side where the steering lock device 42 is disposed in the vehicle-width direction, and the inflator 18 extends in substantially parallel with the axis Lc of the column tube 26. More specifically, the inflator 18 is disposed such that the axis Li of the inflator 18 extends in substantially parallel with the axis Lc of the column tube 26. In the example shown in FIG. 3, the steering lock device 42 is disposed on the right side of the column tube 26 in the vehicle-width direction. Therefore, the inflator 18 is disposed on the left side of the column tube 26 in the vehicle-width direction, i.e., on the side opposite to the side where the steering lock device 42 is disposed. In the lateral view of the vehicle, the inflator 18 is disposed at the same position as in FIG. 1B showing the first embodiment.

Figure 4:
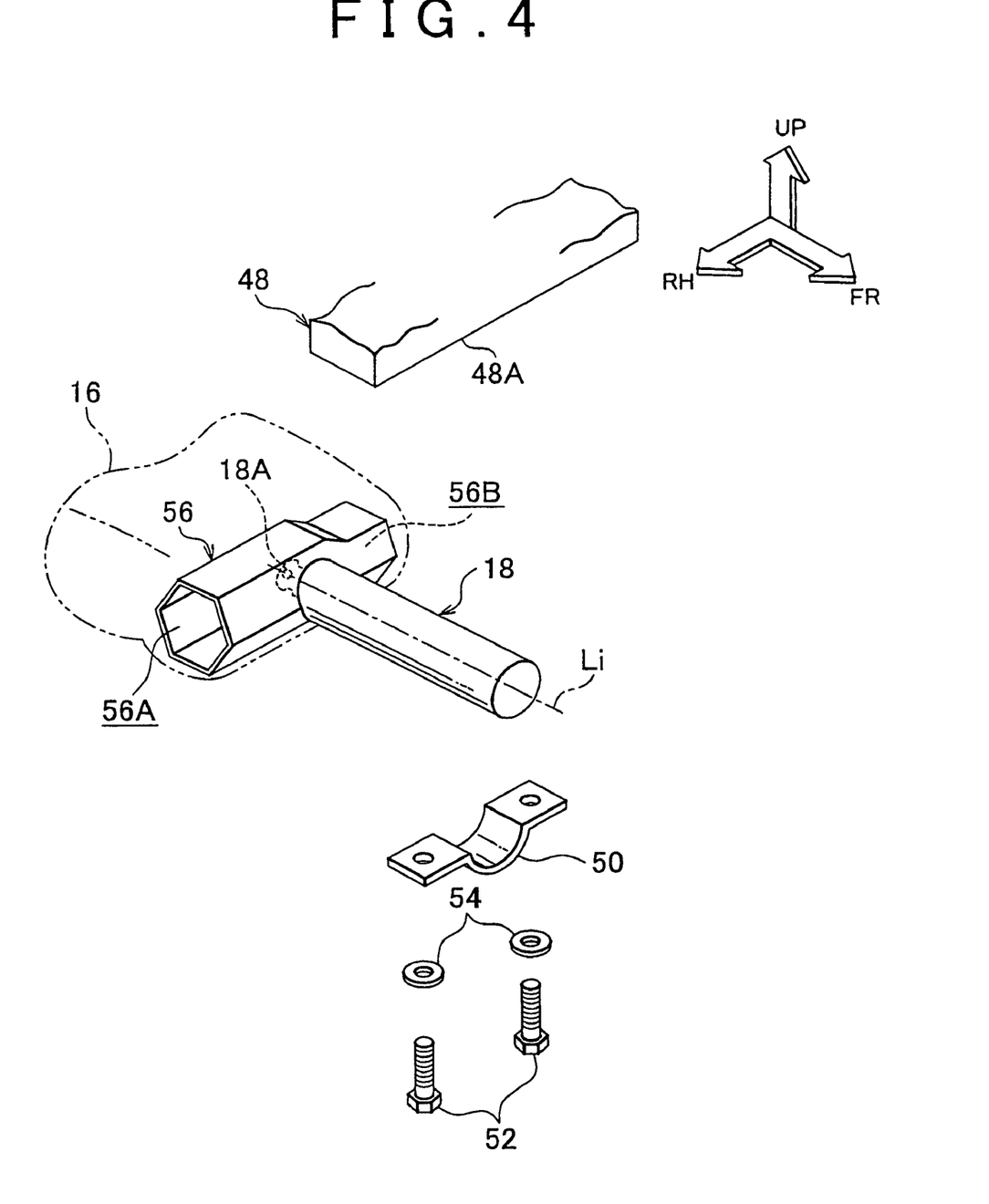
FIG. 4 is an enlarged exploded perspective view showing an inflator that includes a diffuser, and a base and a support fitting that support the inflator in the second embodiment.

In FIG. 4, the end portion of the inflator 18, in which the gas injection ports 18A are formed, faces toward the rear of the vehicle. The end portion of the inflator 18, in which the gas injection ports 18A are formed, is inserted in a diffuser 56 that distributes the gas to the right and left sides in the vehicle-width direction. For example, the diffuser 56 is tubular, and has a hexagonal cross section, and that has a right opening portion 56A, and a left opening portion 56B. The right opening portion 56A is open to the right side in the vehicle-width direction. The left opening portion 56B is open to the left side in the vehicle-width direction. The end portion of the inflator 18, in which gas injection ports 18A are formed, is inserted in the center portion of the diffuser 56 in the vehicle-width direction.

The opening area of the left opening portion 56B of the diffuser 56 is smaller than the opening area of the right opening portion 56A of the diffuser 56. Thus, the amount of gas injected from the left opening portion 56B is smaller than the amount of gas injected from the right opening portion 56A. The amounts of gas injected from the both opening portions are made different from each other so that the right side portion and the left side portion of the airbag door (not shown) in the vehicle-width direction are equally opened, taking into account that a distance between the left opening portion 56B and the left side surface 14L of the steering column cover 14 is different from a distance between the right opening portion 56A and the right side surface 14R. In other words, the opening area of the right opening portion 56A on the side where the steering lock device 42 is disposed is larger than the opening area of the left opening portion 56B on the side opposite to the side where the steering lock device 42 is disposed.

The other portions of the configuration in the second embodiment are the same as those in the first embodiment. Therefore, the same and corresponding portions are denoted by the same reference numerals, and the description thereof will be omitted.

[Advantageous Effects]

In the second embodiment, the knee airbag device has the above-described configuration. Hereinafter, the advantageous effects of the knee airbag device 20 will be described. In FIG. 3, in the knee airbag device 20, the inflator 18 is disposed inside the steering column cover 14 at the position below the column tube 26 such that a portion of the inflator 18 is positioned in the rear area inside the steering column cover 14. The inflator 18 is disposed on the side opposite to the side where the steering lock device 42 is disposed in the vehicle-width direction, and the inflator 18 extends in substantially parallel with the axis Lc of the column tube 26. Therefore, it is possible to easily avoid the interference between the steering lock device 42 and the inflator 18. Thus, it is possible to efficiently deploy the knee airbag 16 while effectively using the limited space inside the steering column cover 14.

Figure 5:
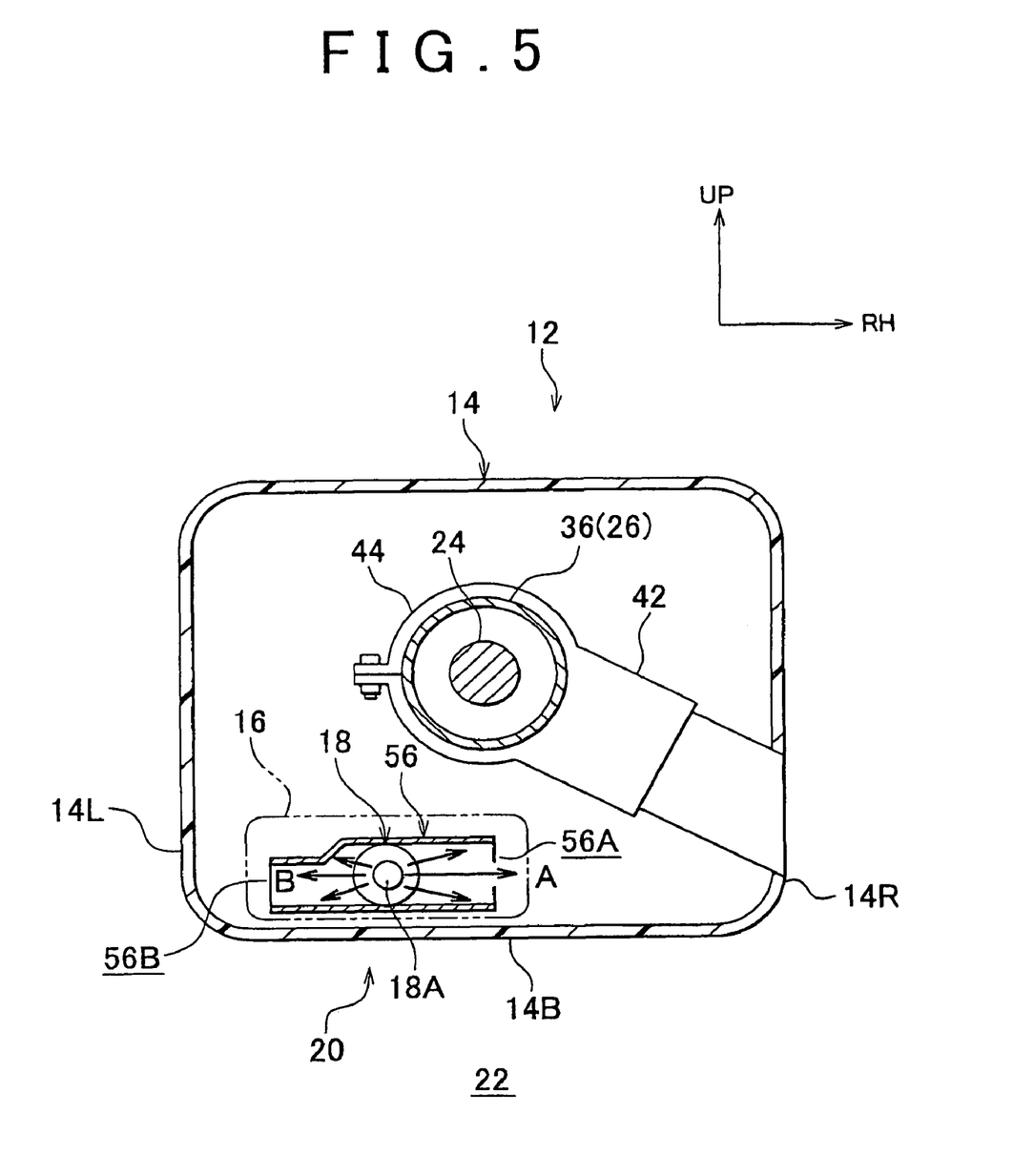
FIG. 5 is a cross sectional view seen from a vehicle cabin, which shows a situation where the diffuser regulates the flow of gas injected from gas injection ports of the inflator, and therefore, the amount of gas injected from the left opening portion of the diffuser is smaller than the amount of gas injected from the right opening portion, according to the second embodiment.

The advantageous effects of the diffuser 56 will be described with reference to FIG. 5. When the inflator 18 is operated, the gas is injected from the gas injection ports 18A into the diffuser 56, and then, the gas is distributed to the right and left sides in the vehicle-width direction through the diffuser 56. The gas is injected from the right opening portion 56A in the direction shown by the arrow A. In addition, the gas is injected from the left opening portion 56B in the direction shown by the arrow B. Thus, the gas is supplied into the knee airbag 16. Because the opening area of the left opening portion 56B is smaller than the opening area of the right opening portion 56A as shown in FIG. 5, the amount of gas injected from the left opening portion 56B is smaller than the amount of gas injected from the right opening portion 56A. Thus, it is possible to reduce the possibility that excessively high deployment pressure of the knee airbag 16 is applied to the left side portion (not shown) of the airbag door in the vehicle-width direction, which is relatively close to the left opening portion 56B. In addition, sufficient deployment pressure is applied to the right side portion (not shown) of the airbag door in the vehicle-width direction, which is relatively far from the right opening portion 56A. Thus, although the inflator 18 is disposed on the left side of the axis Lc of the column tube 26 in the vehicle-width direction, the right side portion and the left side portion of the airbag door (not shown) are equally opened. The injection of the gas toward the right and left sides in the vehicle-width direction using the diffuser 56 is also effective in the configuration where the airbag door is opened to form the opening portion that extends in the lower surface 14B, the left side surface 14L, and the right side surface 14R.

[Third Embodiment]

Figure 6:
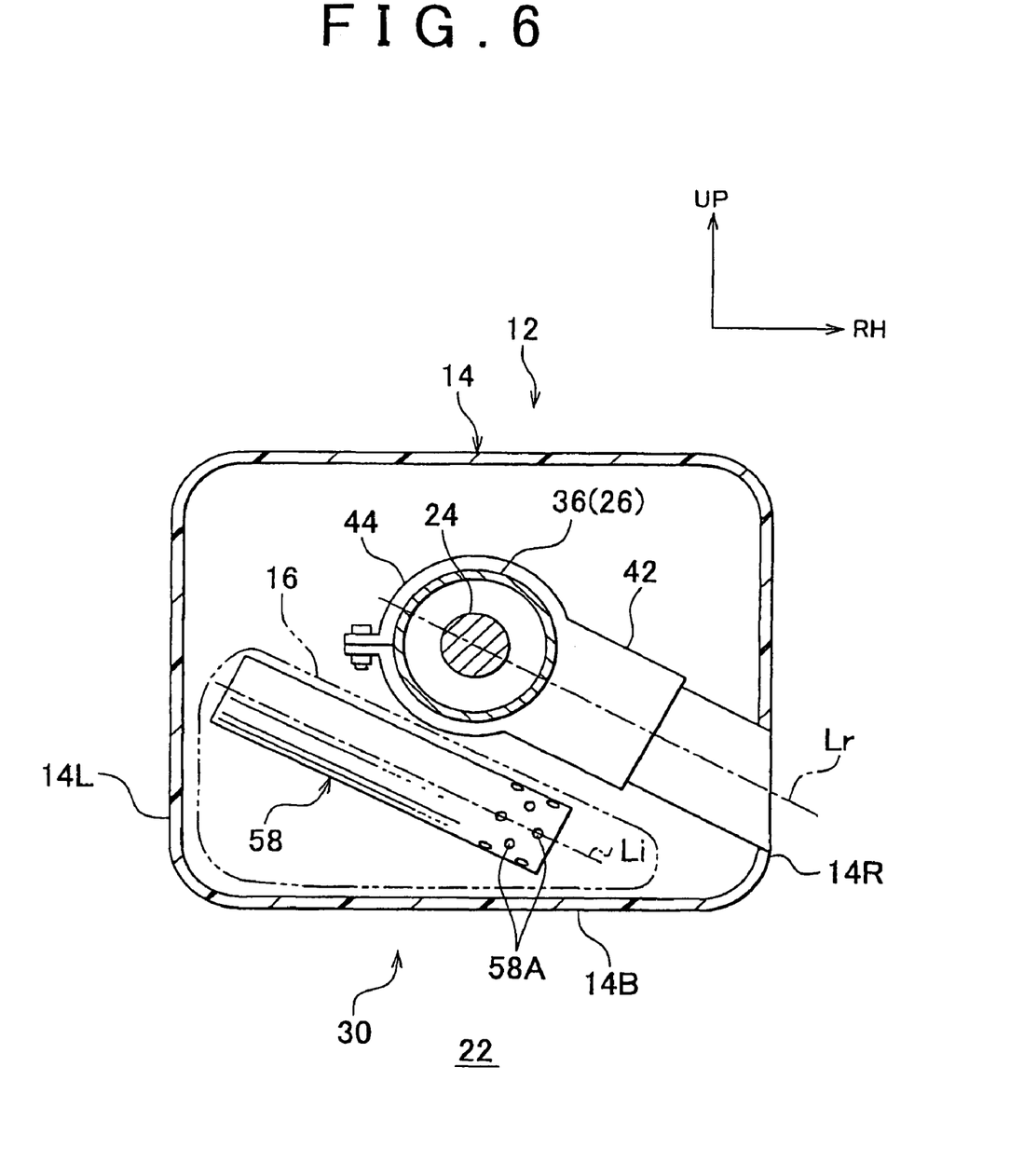
FIG. 6 is a cross sectional view seen from the vehicle cabin, which shows a knee airbag device according to a third embodiment.

In FIG. 6, in a knee airbag device 30 according to a third embodiment, a cylindrical inflator 58, which supplies the gas to the knee airbag 16 to deploy the knee airbag 16, is disposed in the rear area inside the steering column cover 14 at a position below the column tube 26 such that the inflator 18 extends in substantially parallel with the axis Lr of the steering lock device 42. In other words, the axis Li of the inflator 58 extends in the vehicle-width direction, and is substantially orthogonal to the axis Lc of the column tube 26 in the plan view of the vehicle. The steering lock device 42 is also provided in the rear area inside the steering column cover 14, as described above.

Taking into account that a key is inserted into and removed from a key cylinder, the steering lock device 42 extends diagonally downward to the right from the column tube 24. Similarly, the axis Lr extends diagonally downward to the right. Accordingly, the inflator 58 is also disposed to extend diagonally downward to the right such that the axis Li of the inflator 58 extends in substantially parallel with the axis Lr of the steering lock device 42. The end portion of the inflator 58, in which the gas injection ports 58A are formed, faces toward the lower surface 14B of the steering column cover 14. Thus, when the inflator 58 is operated, high deployment pressure of the knee airbag 16 is applied to the airbag door (not shown) that is formed mainly in the lower surface 14B of the steering column cover 14, and thus, the airbag door is efficiently opened.

As shown in FIG. 6, in order to effectively use the space inside the steering column cover, the knee airbag 16 is folded into a substantially triangle shape when the knee airbag 16 is viewed from the vehicle cabin 22. One side of the triangle shape extends along the inflator 58 that extends diagonally downward, another side of the triangle shape extends along the inside of the left side surface 14L of the steering column cover 14, and another side of the triangle shape extends along the inside of the lower surface 14B.

The other portions of the configuration in the third embodiment are the same as those in the first embodiment. Therefore, the same and corresponding portions are denoted by the same reference numerals, and the description thereof will be omitted.

[Advantageous Effects]

In the third embodiment, the knee airbag device 30 has the above-described configuration. Hereinafter, the advantageous effects of the knee airbag device 30 will be described. In FIG. 6, in the knee airbag device 30, the inflator 58 is disposed in the rear area inside the steering column cover 14 at the position below the column tube 26 such that the axis Li of the inflator 58 extends in substantially parallel with the axis Lr of the steering lock device 42. Therefore, the inflator 58 does not interfere with the steering lock device 42. Therefore, it is possible to efficiently deploy the knee airbag 16 by disposing the inflator 58 at the optimum position, that is, the position close to the occupant (not shown), and quickly supplying the gas from the inflator 58 to the knee airbag 16.

The end portion of the inflator 58, in which the gas injection ports 58A are formed, faces toward the lower surface 14B of the steering column cover 14. Thus, when the inflator 58 is operated, high deployment pressure of the knee airbag 16 is applied to the airbag door (not shown), and thus, the airbag door is efficiently deployed. Accordingly, it is possible to quickly deploy the knee airbag 16 toward the vehicle cabin 22 without using the diffuser for regulating the flow of the gas. This improves the performance of the restraining the knees of the occupant (not shown).

In the third embodiment, the inflator 58 is disposed in the rear area inside the steering column cover 14 at the position below the column tube 26 such that the inflator 58 extends in substantially parallel with the axis Lr of the steering lock device 42. However, the inflator 58 may not extend in substantially parallel with the axis Lr of the steering lock device 42, as long as the inflator 58 is disposed on a plane which is substantially parallel to a plane that includes the axis Lc of the column tube 26 and the axis Lr of the steering lock device 42, and which is positioned below the column tube 26. In this case, the end portion of the inflator 58, in which the gas injection ports 58A are formed, faces toward the lower surface 14B of the steering column cover 14, and the rear of the vehicle. Alternatively, the inflator 58 may be disposed on a vertical plane that includes the axis Lr of the steering lock device 42. In this case, the end portion of the inflator 58, in which the gas injection ports 58A are formed, faces toward the lower surface 14B of the steering column cover 14. That is, the axis Li of the inflator 58 may extend in a differential direction from the direction in which the axis Lr of the steering lock device 42 extends, as long as the inflator 58 does not interfere with the steering lock device 42.

In the third embodiment, the inflator 58 is disposed in the rear area inside the steering column cover 14. However, the inflator 58 may be disposed inside the steering column cover 14 such that a portion of the inflator 58 is positioned in the rear area inside the steering column cover 14.

In each of the embodiment, the steering lock device 42 is employed as an example of the projection body. However, the projection body is not limited to the steering lock device 42. Various components or portions, which project downward toward at least one side in the vehicle-width direction, may be regarded as the projection body.

What is claimed is:

1. A knee airbag device comprising:
   a knee airbag that is disposed in a folded state inside a steering column cover inside which a steering lock device that projects downward toward one side in a vehicle-width direction is disposed in a rear area in a vehicle-longitudinal direction, wherein when the knee airbag receives gas, the knee airbag is inflated and deployed from an inside of the steering column cover toward a vehicle cabin; and
   an inflator having a cylindrical shape, which supplies the gas to the knee airbag to deploy the knee airbag,
   wherein:
   the inflator is disposed inside the steering column cover such that at least a portion of the inflator is positioned in the rear area inside the steering column cover;
   the inflator is disposed in substantially parallel with an axis of a column tube such that the inflator is positioned below the column tube;
   the inflator is disposed on a side opposite to a side where the steering lock device is disposed in the vehicle-width direction; and an end portion of the inflator, in which a gas injection port is formed, faces toward a rear of the vehicle.

2. The knee airbag device according to claim 1, wherein the inflator is disposed substantially directly under the column tube.

3. The knee airbag device according to claim 1, wherein:
the inflator is connected to a diffuser that is tubular, and that extends in the vehicle-width direction;
opening portions are formed at right and left ends of the diffuser in the vehicle-width direction; and
an opening area of the opening portion on the side where the steering lock device is disposed is larger than an opening area of the opening portion on the side opposite to the side where the steering lock device is disposed.

4. The knee airbag device according to claim 1, wherein the inflator is connected to a member inside the steering column cover such that the inflator slides in an axial direction of the column tube.

5. The knee airbag device according to claim 1, wherein the steering lock device is connected to the column tube, and projects downward toward one side in the vehicle-width direction from the column tube.

6. The knee airbag device according to claim 1, wherein a gas injection port formed at an end portion of the inflator is connected to a diffuser that extends in the vehicle-width direction, opening portions are formed at right and left ends of the diffuser in the vehicle-width direction, and an opening area of the opening portion on the side where the steering lock device is disposed is larger than an opening area of the opening portion on the side opposite to the side where the steering lock device is disposed.

7. A knee airbag device comprising:
a knee airbag that is disposed in a folded state inside a steering column cover inside which a steering lock device that projects downward toward one side in a vehicle-width direction is disposed in a rear area in a vehicle longitudinal direction, wherein when the knee airbag receives gas, the knee airbag is inflated and deployed from an inside of the steering column cover toward a vehicle cabin; and
an inflator having a cylindrical shape, which supplies the gas to the knee airbag to deploy the knee airbag,
wherein:
the inflator is disposed inside the steering column cover such that at least a portion of the inflator is positioned in the rear area inside the steering column cover;
the inflator is disposed on a first plane;
the inflator is disposed on a side opposite to a side where the steering lock device is disposed in the vehicle-width direction;
the first plane is substantially parallel to a plane that includes an axis of a column tube and an axis of the steering lock device, and the first plane is positioned below the column tube; and
an end portion of the inflator, in which a gas injection port is formed, faces toward a lower surface of the steering column cover and a rear of a vehicle.

8. The knee airbag device according to claim 7, wherein the inflator is disposed in substantially parallel with the axis of the steering lock device.

9. The knee airbag device according to claim 7, wherein the gas injection port is formed in a peripheral surface of a housing of the inflator at a position close to the lower surface of the steering column cover.

10. The knee airbag device according to claim 7, wherein the steering lock device is connected to the column tube, and projects downward toward one side in the vehicle-width direction from the column tube.

11. A knee airbag device comprising:
a knee airbag that is disposed in a folded state inside a steering column cover inside which a steering lock device that projects downward toward one side in a vehicle-width direction is disposed in a rear area in a vehicle longitudinal direction, wherein when the knee airbag receives gas, the knee airbag is inflated and deployed from an inside of the steering column cover toward a vehicle cabin; and
an inflator having a cylindrical shape, which supplies the gas to the knee airbag to deploy the knee airbag,
wherein:
the inflator is disposed inside the steering column cover such that at least a portion of the inflator is positioned in the rear area inside the steering column cover;
the inflator is disposed on a first plane at a position below a column tube;
the inflator is disposed on a side opposite to a side where the steering lock device is disposed in the vehicle-width direction;
the first plane is a vertical plane that includes an axis of the steering lock device; and
an end portion of the inflator, in which a gas injection port is formed, faces toward a lower surface of the column cover.

12. The knee airbag device according to claim 11, wherein the steering lock device is connected to a column tube, and projects downward toward one side in the vehicle-width direction from the column tube.

13. A knee airbag device comprising:
a knee airbag that is disposed in a folded state inside a steering column cover inside which a steering lock device that projects downward toward one side in a vehicle-width direction is disposed in a rear area in a vehicle-longitudinal direction, wherein when the knee airbag receives gas, the knee airbag is inflated and deployed from an inside of the steering column cover toward a vehicle cabin; and
an inflator having a cylindrical shape, which supplies the gas to the knee airbag to deploy the knee airbag,
wherein:
the inflator is disposed inside the steering column cover such that at least a portion of the inflator is positioned in the rear area inside the steering column cover;
the inflator is disposed in substantially parallel with an axis of a column tube such that the inflator is positioned below the column tube;
a gas injection port formed at an end portion of the inflator is connected to a diffuser that extends in the vehicle-width direction, opening portions are formed at right and left ends of the diffuser in the vehicle-width direction, and an opening area of the opening portion on the side where the steering lock device is disposed is larger than an opening area of the opening portion on the side opposite to the side where the steering lock device is disposed; and
an end portion of the inflator, in which a gas injection port is formed, faces toward a rear of the vehicle.

* * * * *

UNITED STATES PATENT AND TRADEMARK OFFICE
CERTIFICATE OF CORRECTION

PATENT NO. : 7,722,076 B2  
APPLICATION NO. : 11/979819  
DATED : May 25, 2010  
INVENTOR(S) : Osamu Fukawatase et al.

It is certified that error appears in the above-identified patent and that said Letters Patent is hereby corrected as shown below:

On the title page item

(73) Assignees: Toyota Jidosha <u>Kabuhsiki</u> Kaisha, Toyota (JP), Toyoda Gosei Co., Ltd., Nishikasugai (JP)

should correctly reflect:

(73) Assignees: Toyota Jidosha Kabushiki Kaisha, Toyota (JP), Toyoda Gosei Co., Ltd., Nishikasugai (JP)

Signed and Sealed this

Seventeenth Day of August, 2010

David J. Kappos  
*Director of the United States Patent and Trademark Office*